(12) United States Patent
Specht

(10) Patent No.: US 12,139,088 B2
(45) Date of Patent: Nov. 12, 2024

(54) SAFETY DEVICE AND SAFETY SYSTEM FOR A MOTOR VEHICLE HAVING AN ADDITIONAL DRIVE BATTERY COUPLING, AND METHOD

(71) Applicant: HS PRODUCTS ENGINEERING GMBH, Maisach (DE)

(72) Inventor: Martin Specht, Feldafing (DE)

(73) Assignee: HS PRODUCTS ENGINEERING GMBH, Maisach (DE)

( * ) Notice: Subject to any disclaimer, the term of this patent is extended or adjusted under 35 U.S.C. 154(b) by 293 days.

(21) Appl. No.: 17/593,070

(22) PCT Filed: Mar. 11, 2020

(86) PCT No.: PCT/EP2020/056516
§ 371 (c)(1),
(2) Date: Sep. 8, 2021

(87) PCT Pub. No.: WO2020/182891
PCT Pub. Date: Sep. 17, 2020

(65) Prior Publication Data
US 2022/0048457 A1    Feb. 17, 2022

(30) Foreign Application Priority Data

Mar. 12, 2019  (DE) ............... 10 2019 106 303.5

(51) Int. Cl.
*B60R 21/017* (2006.01)
*B60L 1/00* (2006.01)
*B60R 21/01* (2006.01)

(52) U.S. Cl.
CPC ............ *B60R 21/017* (2013.01); *B60L 1/003* (2013.01); *B60L 2240/14* (2013.01); *B60R 2021/01272* (2013.01)

(58) Field of Classification Search
CPC .............. B60R 21/01; B60R 21/01512; B60R 21/01516; B60R 21/0152; B60R 21/152;
(Continued)

(56) References Cited

U.S. PATENT DOCUMENTS

| 6,463,372 | B1 | 10/2002 | Yokota et al. | |
| 6,629,905 | B1 * | 10/2003 | Sesselmann | E05F 11/483 49/352 |

(Continued)

FOREIGN PATENT DOCUMENTS

| DE | 197 31 689 A1 | 2/1999 | |
| DE | 102004033560 A1 * | 2/2006 | ............... H02J 1/06 |

(Continued)

OTHER PUBLICATIONS

Translation of DE-102004033560-A1 (Year: 2006).*
"Gleichspannungswandler." Wikipedia, Accessed Jan. 9, 2023, URL <https://web.archive.org/web/20171225123635/https://de.wikipedia.org/wiki/Gleichspannungswandler>.

*Primary Examiner* — Russell Frejd
*Assistant Examiner* — Sara J Lewandroski
(74) *Attorney, Agent, or Firm* — Nixon Peabody LLP

(57) ABSTRACT

Provided is a security device for a motor vehicle for automatically moving a device of the motor vehicle in a predefined driving situation, including an electric motor for moving the device and a first current supply interface that can be electrically coupled to an on-board current supply system of the motor vehicle. The security device includes a second current supply interface for electrically coupling the electric motor to a drive battery of the motor vehicle. The second current supply interface includes a switching device with switching for electrically coupling the electric motor to the drive battery depending on the predefined driving situation. Furthermore, provided is a security system with
(Continued)

Figure 1:
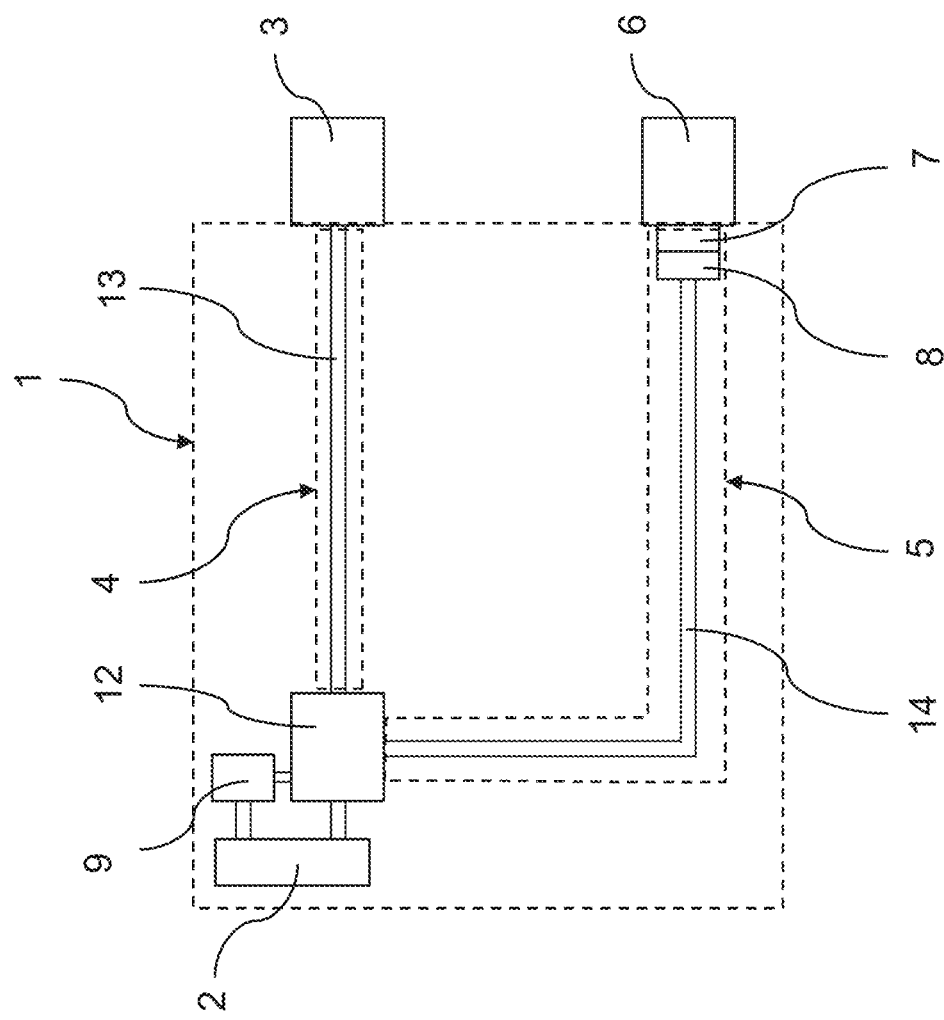

2: electric motor
3: on-board current supply system
6: drive battery
12: controlling device several security devices and a method for operating such a security system.

12 Claims, 3 Drawing Sheets

(58) Field of Classification Search
CPC ........ B60R 21/10522; B60R 21/01524; B60R 21/01526; B60R 21/0153; B60R 21/01532; B60R 21/01534; B60R 21/01536; B60R 21/01538; B60R 21/0154; B60R 21/01542; B60R 21/01544; B60R 21/01546; B60R 21/01548; B60R 21/0155; B60R 21/01552; B60R 21/01554; B60R 21/01558; B60R 21/02; B60R 21/013; B60R 21/0132; B60R 2021/01013; B60R 2021/01034; B60R 2021/01204; B60R 2021/01211; B60R 2021/01252; B60R 2021/01259; B60R 2021/01265; B60R 2021/01272; B60R 2021/01279; B60R 2021/01286; B60R 2021/01302
See application file for complete search history.

(56) References Cited

U.S. PATENT DOCUMENTS

| 2002/0188393 | A1* | 12/2002 | Yokota | B60R 21/0132 |
| | | | | 701/45 |
| 2005/0131606 | A1* | 6/2005 | Motozawa | B60N 2/42763 |
| | | | | 701/45 |
| 2009/0192681 | A1* | 7/2009 | Hayashi | B60H 1/00978 |
| | | | | 701/45 |
| 2011/0110002 | A1* | 5/2011 | Ooshima | H02P 7/29 |
| | | | | 361/33 |

FOREIGN PATENT DOCUMENTS

| DE | 10 2006 036 491 A1 | 2/2008 |
| DE | 102008040145 A1 | 1/2010 |
| DE | 10 2008 041 312 A1 | 2/2010 |
| DE | 10 2009 048 711 A1 | 4/2011 |
| DE | 10 2011 015 531 A1 | 12/2011 |
| DE | 102011102093 A1 | 11/2012 |
| DE | 10 2014 201 344 A1 | 7/2015 |
| EP | 2 444 289 A1 | 4/2012 |
| JP | 7-277132 A | 10/1995 |
| WO | 99/51469 A1 | 10/1999 |

* cited by examiner

SAFETY DEVICE AND SAFETY SYSTEM FOR A MOTOR VEHICLE HAVING AN ADDITIONAL DRIVE BATTERY COUPLING, AND METHOD

The present invention relates to a security device for a motor vehicle for automatically moving a device of the motor vehicle in a predefined driving situation. Furthermore, the invention relates to a security system for a motor vehicle with a security device according to the invention as well as a method for operating a security system according to the invention for a motor vehicle.

As a result of continuously growing traffic density and the associated increased risk of accidents, the security of vehicle occupants plays a special role in the development of motor vehicles. Security systems are basically divided into two main groups, namely accident-avoiding security systems and security systems that reduce the severity of accidents. Accident-avoiding security systems are designed in particular to detect potentially dangerous driving situations and, if necessary, to initiate measures to avert an accident. In this context, a further distinction is made between systems that actively intervene in the driving operation of the motor vehicle and warning systems for warning occupants, in particular the driver, of the motor vehicle. Actively intervening systems can, for example, influence wheel torques, steering angles or vehicle inclination. In this way, for example, the wheels can be prevented from blocking, a braking process can be initiated or an evasive maneuver can be carried out, taking into account in particular the vehicle's center of gravity of the motor vehicle. For this purpose, the shock absorbers are provided with a rapid adjustment, for example. Warning systems usually indicate the presence of a dangerous situation visually, acoustically or haptically, for example by means of warning lights in the dashboard or side mirrors, warning tones, vibration of the steering wheel or the like. Often, actively intervening security systems are coupled with warning systems, so that an automatic intervention of an actively intervening security system is announced or at least confirmed by means of a warning system.

One of the main tasks of security systems that reduce the severity of accidents is to reduce the impact of a dangerous driving situation or accident on the occupants of the motor vehicle, the environment of the motor vehicle or the motor vehicle itself. To protect occupants, for example, a body design, in particular adjustable body elements, sliding roofs or the like, chassis components, airbags, security glass, vehicle seats, headrests, roll bars, steering wheel retraction devices or seat belts are known as security systems that reduce the severity of accidents. Seat belts and vehicle seats have the task of holding an occupant of the motor vehicle in position in the event of severe deceleration, such as emergency braking, an impact with an obstacle or the like, in order to prevent or at least reduce injuries to the occupant. To improve this task, modern security systems comprise so-called rapid adjustment devices, such as belt tensioners, seat position adjusters, shock absorber adjusters, steering angle adjusters, steering wheel retraction devices or the like, which perform a modification to protect the occupants of the motor vehicle in a dangerous situation, in particular immediately before a collision or during emergency braking. A belt tensioner, for example, is designed to take up slack from the security system in such a dangerous situation, thus allowing the occupant to participate better or earlier in the vehicle deceleration. A steering wheel retraction device is designed, for example, to move the steering wheel away from the driver of the motor vehicle in order to prevent or at least reduce injuries caused by the steering wheel and to provide more free space for an airbag to deploy and/or for an occupant to move forward. By means of the seat position adjuster, the vehicle seat can be modified in such a way that the risk of injury to the driver is reduced. A critical driving situation can be detected, for example, by means of an appropriately designed sensor system, in particular by means of acceleration sensors, optical sensors, radar sensors or the like. Sensor data from the sensors can be evaluated via a control device or a triggering device in order to trigger the rapid adjustment devices as required. Alternatively, the sensor system and triggering device can be designed as a purely mechanical unit.

Known rapid adjustment devices in belt tensioners or seat elements, such as seat ramps or headrests, for example, comprise an explosive charge that can be ignited in a critical driving situation and tightens the seat belt or moves a seat element to a different position. Such rapid adjustment devices have the disadvantage that the charge is used up after ignition and the explosive charge has to be reloaded in a workshop. If, for example, an accident occurs between the time the seat belt is tightened and the time the belt tensioner is reloaded, the belt tensioner is out of action. The same applies, of course, to the seat rapid adjustment device. The affected occupant of the motor vehicle is then no longer optimally protected. An alternative embodiment, e.g. of a belt tensioner, comprises an electric motor instead of the explosive charge, which can be activated in a critical driving situation and tightens the seat belt. The same is also possible on seat component adjusters such as headrests or ramps. Such electric motors can usually handle rapid adjustments spaced at intervals without any problems. At the same time, however, such electric motors usually require a relatively large amount of installation space and have a high dead weight in order to provide sufficient power, torque and/or adjustment force for a rapid adjustment process. This is a particular disadvantage in the case of very limited installation space. Furthermore, the energy consumption of a motor vehicle increases with its weight, so that electric motors of this type result in higher energy consumption by the motor vehicle.

The use of electric flat motors has proved particularly advantageous for reducing the weight of rapid adjustment devices such as belt tensioners. In an electric flat motor, a rotor is rotatably mounted between two plate-shaped stator halves. Compared with conventional electric motors, such electric flat motors with laterally arranged so-called air coils require less installation space while offering a high possible torque. However, conventional electric flat motors have the disadvantage that a maximum torque is relatively low or sufficient torque can only be achieved with high current. In addition, electric flat motors tend to burn out under high load, since they have to be driven with relatively high currents to generate a high torque. This particularly affects electric flat motors that are under regular high load. Finally, when electric flat motors are subjected to high loads, one stator half may bend due to the strong magnetic field. In extreme cases, the stator half and the rotor can even touch each other, thus decelerating the rotor and damaging or, in the worst case, destroying the electric flat motor.

The use of electric motors often has the disadvantage that a very large amount of electric energy is required for a particularly rapid adjustment. A conventional on-board current supply system of the motor vehicle is usually not designed for this, so that only part of the power potentially available from the electric motor can be effectively used. This clearly limits the maximum adjustment speed of the security device.

It is therefore an object of the present invention to eliminate or at least partially eliminate the disadvantages described above in a security device for a motor vehicle for automatically moving a device of the motor vehicle in a predefined driving situation, in a security system for a motor vehicle and in a method for operating a security system for a motor vehicle. In particular, it is an object of the present invention to provide a security device, a security system as well as a method which ensure in a simple and cost-effective manner an improved adjustment speed of a device of the motor vehicle, in particular of a belt tensioner or a seat adjustment, when a predefined driving situation occurs.

The foregoing object is solved by the patent claims. Accordingly, the object is solved by a security device for a motor vehicle for automatically moving a device of the motor vehicle in a predefined driving situation, by a security system for a motor vehicle, and by a method for operating a security system for a motor vehicle. Further features and details of the invention result from the dependent claims, the description and the figures. Features and details described in connection with the security device according to the invention naturally also apply in connection with the security system according to the invention and the method according to the invention, and vice versa in each case, so that reference is or can always be made mutually with respect to the disclosure of the individual aspects of the invention.

According to the first aspect of the invention, the object is solved by a security device for a motor vehicle for automatically moving a device of the motor vehicle in a predefined driving situation. The security device comprises an electric motor for moving the device and a first current supply interface that can be electrically coupled to an on-board current supply system of the motor vehicle. According to the invention, the security device comprises a second current supply interface for electrically coupling the electric motor to a drive battery of the motor vehicle. The second current supply interface comprises a switching device with switching means for electrically coupling the electric motor to the drive battery depending on the predefined driving situation.

The security device is designed to automatically move a device of the motor vehicle. Such a device of the motor vehicle can be designed, for example, as a seat belt, steering wheel, drivers seat, passengers seat, headrest, armrest or the like. The security device is preferably designed for automatic movement of the device as part of an adjustment or alignment of the device in the motor vehicle, in particular for adaptation to body sizes, stature or the like of the vehicle occupants. An adjustment speed that can be achieved for this purpose is relatively moderate in order to improve manual control of the adjustment or alignment and to avoid superfluous back and forth maneuvering due to excessively long reaction times of the operator. Another advantage of a moderate adjustment speed is that injuries to the occupants can be better avoided in this way. In addition, the security device is designed to move the device automatically in the predefined driving situation. This automatic movement is designed in contrast to an adjustment or alignment to a relatively high adjustment speed, for example, in order to cause a correspondingly rapid adjustment of the device in the event of a vehicle crash, in particular to reduce a risk of injury to the occupants of the motor vehicle. Since milliseconds are crucial in such a driving situation, a moderate adjustment speed is fundamentally unsuitable. A resulting loss of comfort for the occupants of the motor vehicle can be accepted at the expense of increased security.

The electric motor of the security device is designed to move the device. For this purpose, the electric motor can be electrically coupled to the on-board current supply system of the motor vehicle via the first current supply interface. Preferably, the security device comprises a controlling device for controlling a rotation speed and/or direction of rotation or torque of the electric motor. The controlling device is further preferably configured to control the switching device. Accordingly, it is preferred that the controlling device is electrically coupled to the electric motor and the switching device. A current flow from the drive battery can preferably be realized via the controlling device to the electric motor.

Preferably, the security device comprises a recognition device for recognizing the predefined driving situation. For this purpose, the recognition device preferably comprises one or more sensors, in particular an acceleration sensor, a speed sensor, a distance measurement sensor or the like. The recognition device is designed to recognize when a predefined driving situation exists on the basis of the sensor data.

In the context of the invention, a predefined driving situation is understood to be a driving situation, in particular a critical driving situation, in which intervention by the security device or a security system is advantageous. A predefined driving situation may, for example, be determined by a relatively large deceleration of the motor vehicle, such as in the case of emergency braking or a crash or immediately before a crash. Likewise, a predefined driving situation can be determined by high centrifugal forces, such as during fast cornering, skidding or the like. The basic rule for the predefined driving situation is that the risk of injury to the occupants is increased compared to normal driving situations.

In the context of the invention, an on-board current supply system of the motor vehicle is understood to be a conventional low-voltage current supply system of the motor vehicle with usual operating voltages between 12V and 48V with deviations due to production and/or operation. In exceptional cases, the operating voltages may also deviate from this. By means of the first current supply interface, the security device can be coupled or is coupled to the on-board current supply system.

The drive battery of the motor vehicle is preferably electrically decoupled from the on-board current supply system and/or preferably comprises an operating voltage that is greater than the operating voltage of the on-board current supply system. Preferably, a drive battery is designed to provide electric energy for a drive electric motor for driving the motor vehicle. The operating voltages here are in the range between 200V and 1000V, in particular between 400V and 800V.

By means of the second current supply interface, the security device can be electrically coupled to the drive battery of the motor vehicle. In the context of the invention, the second current supply interface is understood to mean in particular a connection between the drive battery and the electric motor or the controlling device. For electric coupling and decoupling, the second current supply interface comprises the switching device, which is preferably controllable by means of the controlling device. Alternatively, it can be provided that the second current supply interface comprises a detection device, such as sensors, for acquiring the predefined driving situation.

The switching device is preferably designed to establish the electric coupling with the drive battery in such a way that this reinforces a predefined rotation of a rotor of the electric motor for automatically moving the device into a position beneficial to the occupant in the event of a vehicle crash. In the case of a steering wheel adjustment device, for example, the electric coupling allows the steering wheel to be moved away from the driver particularly rapidly. In the case of a belt tensioner, the electric coupling with the drive battery enables the belt to be tightened more rapidly. Likewise, a switching duration of the electric coupling with the drive battery can be predetermined in order to avoid overloading the electric motor, in particular after the device has reached the advantageous position.

A security device according to the invention has the advantage over conventional security devices that an automatic movement of the device of the motor vehicle can be carried out more rapidly by simple means as well as in a cost-effective manner. By electrically coupling with the drive battery of the motor vehicle by means of the switching device of the second current supply interface, additional electric energy can be provided to the electric motor in a relatively short time. By means of this additional electric energy, the electric motor can be operated with a significantly higher power, so that the time required for an adjustment process of the device is reduced in an advantageous manner.

According to a preferred embodiment of the invention, it can be provided in a security device that the second current supply interface comprises switching means for electrically coupling the electric motor to a drive battery of the motor vehicle which is designed as a high-voltage drive battery. A high-voltage drive battery or HV drive battery of the motor vehicle is understood to mean in particular a drive battery which is designed for one or more electric motors for driving the motor vehicle with electric energy. Likewise, a drive battery system comprising several serially connected low-voltage drive batteries or LV drive batteries is also regarded as a HV drive battery within the scope of the invention. Common voltages of such HV drive batteries are between 200V and 1000V, in particular between 400V and 800V. An electric coupling with the HV drive battery has the advantage that sufficient electric energy can be provided to the electric motor in an advantageous manner in order to effect a particularly rapid adjustment of the device in the predefined driving situation.

According to the invention, it is preferred that the second current supply interface comprises a resistor such that a predominant part of the voltage of the HV drive battery drops at the second current supply interface. The resistor is thus designed such that at least 50% of the voltage of the HV drive battery drops across this resistor. In particular, the resistor is designed to cause such a voltage drop that an overload, in particular a burnout, of the electric motor is prevented thereby. Preferably, the resistor is designed in such a way that the electric motor can be electrically coupled to the HV drive battery at least ten times without failing. According to the invention, the electric motor is preferably designed accordingly. According to the invention, the resistor can be implemented in various ways. For example, it may be provided that the resistor is formed as a component part of the second current supply interface. In addition or alternatively, a current line of the second current supply interface for electrically coupling the electric motor and the HV drive battery can have a corresponding design in order to implement such a resistor in this way. Design parameters for this are line cross-section, line length as well as line material.

Such a resistor has the advantage that damage to the electric motor can be avoided by simple means and in a cost-effective manner.

According to a preferred further development of the invention, the switching device comprises a voltage converter for converting the voltage of the drive battery to a lower voltage. The voltage converter is preferably designed in accordance with a conventional transformer for converting the voltage of the drive battery to a voltage that is compatible for the electric motor. In the context of the invention, a "compatible voltage" is understood to mean in particular a voltage by means of which the electric motor can be driven at least ten times to adjust the device of the motor vehicle without damaging the electric motor. According to the invention, the electric motor is preferably designed accordingly. A voltage converter has the advantage that the electric motor can be electrically coupled to the drive battery, in particular a HV drive battery, of the motor vehicle by simple means and in a cost-effective manner and can thus be operated.

Preferably, the switching device comprises consideration means for considering a current acceleration, a current deceleration, a predicted acceleration or a predicted deceleration of the motor vehicle as a predefined driving situation. A current acceleration as well as a current deceleration can be determined, for example, by means of one or more acceleration sensors, which are preferably part of the security device or another vehicle system of the motor vehicle. For example, if the driver performs an emergency braking, this can be acquired by means of the security device and a rapid adjustment of the device of the motor vehicle, such as the security device, the steering wheel or the like, can be performed by electrically coupling the electric motor with the drive battery. A predicted acceleration as well as a predicted deceleration can be determined, for example, on the basis of radar sensors, optical sensors, in particular vehicle cameras, or the like. For example, if a rear camera recognizes an approaching motor vehicle, the determined speed and deceleration of the approaching motor vehicle can be used to predict a vehicle crash and thus an associated acceleration of the motor vehicle. By means of the security device according to the invention, the device of the motor vehicle can thus be adjusted particularly rapidly by simple means and in a cost-effective manner, so that the security of the occupants is considerably improved in many driving situations.

According to the invention, it is preferred that the switching device comprises comparison means for comparing a current driving situation with the predefined driving situation and for activating an increased switching readiness position when a predefined proximity of the current driving situation to the predefined driving situation is determined. The predefined proximity to the predefined driving situation can be used to qualitatively determine a probability that the predefined driving situation is about to occur. When driving freely on a highway without curves and traffic, the switching device would not assert such proximity and thus would not activate the increased switching readiness position. If the motor vehicle with the security device according to the invention is approaching the end of a traffic jam at excessive speed, for example, but is still far enough away from it so that braking is still possible without emergency braking, the switching device can already determine that the current driving situation is within the predefined proximity to the predefined driving situation. By activating the switching readiness position, a reaction of the switching device when the predefined driving situation occurs is improved. Accordingly, this has the advantage that the reliability of the security device is improved by simple means and in a cost-effective manner.

Preferably, the electric motor is designed as an electric flat motor. Preferably, a rotor in the electric flat motor is rotatably mounted between two plate-shaped stator halves. An electric flat motor has the advantage that it requires less space than a conventional electric motor. In particular, electric flat motors, which essentially have expansions in two dimensions, can be arranged in an advantageous manner at locations where a particularly small installation space is available in one dimension.

Preferably, the security device comprises a determination device for determining a resistance opposing the operation of the electric motor, wherein the switching device comprises decoupling means for electrically decoupling the electric motor from the drive battery upon determination of a resistance exceeding a resistance threshold value. The resistance threshold value is preferably selected in such a way that it can be reached in particular when the device of the motor vehicle is moved into an intended position by means of the security device. This is the case, for example, with a belt tensioner if the belt has a predefined belt tension. The predefined belt tension is preferably set after a consideration, according to which the fixation of the occupant by the belt is compared with a possible injury to the occupant by a belt that is too tight. Accordingly, such a determination device has the advantage that a risk of injury can be reduced by simple means and in a cost-effective manner, while still ensuring a high level of occupant security.

Particularly preferably, the security device is in the form of a belt tensioning system, a seat adjustment system, a sunroof system, a rollover bar, a comfort system, a hood adjustment system or a steering wheel adjustment system. A comfort system may include, for example, movable tables or cup holders. In a belt tensioning system, the device of the motor vehicle to be moved is, for example, a seat belt, a belt reel for retracting the seat belt or the like. By means of the security device, the belt can be tightened, for example, in such a way that the occupant is held better or more securely in the seat by the seat belt. In a seat adjustment system, the device of the motor vehicle to be moved is a vehicle seat, for example a drivers seat, a passengers seat, a rear seat or the like. By means of the security device, for example, a seat height, a horizontal position of the seat in the direction of travel, a lateral position of the seat, an angle of inclination of the seat, and/or an angle of inclination of the backrest can be adjusted. In particular, the device acts on a seat ramp, a headrest, a footrest and/or the seat cheeks of the seat. In this way, the occupants can be better protected, in particular from collisions with airbags, body components or the like. In a steering wheel adjustment system, the device of the motor vehicle to be moved is, for example, a steering wheel, a steering column or the like. For example, the steering wheel can be moved towards the dashboard by means of the security device in order to avoid or at least reduce a collision with the driver. Furthermore, an adjustment of aerodynamic components, such as front spoiler, rear spoiler or side skirts, is also conceivable within the scope of this embodiment.

According to a second aspect of the invention, the object is solved by a security system for a motor vehicle. According to the invention, the security system comprises several security devices according to the invention. The security devices may be designed differently and, in particular, for adjusting different devices of the motor vehicle. For example, the security system comprises one security device each for the seat belts or seat belt tensioners of the motor vehicle. Additionally or alternatively, the security system comprises a security device for the drivers seat or drivers seat adjustment and/or a security device for the front passengers seat or front passengers seat adjustment. Additionally or alternatively, the security system comprises a security device for the steering wheel or steering wheel adjustment.

The security system for a motor vehicle according to the invention has the same advantages as described above for a security device for a motor vehicle for automatically moving a device of the motor vehicle in a predefined driving situation according to the first aspect of the invention. Accordingly, the security system according to the invention has the advantage over conventional security systems that an automatic movement of one or more devices of the motor vehicle can be carried out more rapidly, in particular in a reversible manner, by simple means as well as in a cost-effective manner. By electrically coupling with the drive battery of the motor vehicle by means of the switching device of the second current supply interface, additional electric energy can be provided to the electric motor in a relatively short time. By means of this additional electric energy, the electric motor can be operated with a significantly higher power or torque, so that the duration of an adjustment process of the device is reduced in an advantageous manner.

According to the invention, it is preferred that the switching devices comprise coordination means for time-delayed electric coupling of the respective electric motors of the security devices to the drive battery of the motor vehicle. The time-delayed coupling preferably distinguishes between the type of device to be adjusted and the arrangement of the device to be adjusted. A time-delayed electric coupling has several advantages. On the one hand, it can be advantageous if different devices are adjusted at different times. For example, it is advantageous to actuate a belt tensioner relatively early, while an adjustment of a steering wheel can preferably take place later in order to ensure that the motor vehicle can be steered for as long as possible. On the other hand, it is advantageous if, for example, the drivers seat belt is tightened before the passengers seat belt so that the driver can steer the motor vehicle better and sufficient electric energy is available to the electric motor for adjusting the drivers seat belt. By means of the time-delayed electric coupling, it is therefore possible to prevent by simple means and in a cost-effective manner that the electric motors of the various security devices take the electric energy from each other and thus cannot be operated at full power.

According to a preferred further development of the invention, it can be provided in a security system that the switching devices comprise occupancy means for electrically coupling the respective electric motors of the security devices to the drive battery of the motor vehicle depending on a detected seat occupancy of the motor vehicle. Preferably, the body weights of the occupants are taken into account here, so that, for example, belt tensioning for lighter persons is adjusted in terms of energy compared to heavier persons. In this way, it is also possible to avoid adjusting devices that do not affect any occupant.

It is preferred that the security system comprises a detection device for detecting a driving situation of the motor vehicle. The detection device comprises, for example, an acceleration sensor, a speed sensor, a camera, a radar, a lidar, a GPS module, a temperature sensor, a rain sensor, a humidity sensor, a traffic warning system, a steering angle sensor, a float angle sensor, a rotation sensor, a chassis sensor, an inclination sensor or any combination of these detection means. Alternatively or additionally, the detection device is connected or can be connected to an on-board current supply system of the motor vehicle via one or more data interfaces designed for this purpose, in order to thus query sensor data from other systems of the motor vehicle. This avoids redundancies in detection means. In this way, the current driving situation and thus also the existence of a predefined driving situation can be determined by simple means and in a cost-effective manner.

According to a third aspect of the invention, the object is solved by a method for operating a security system according to the invention for a motor vehicle. The method comprises the following steps:
- detecting a current driving situation of the motor vehicle by means of a detection device,
- comparing the detected current driving situation with a predetermined driving situation by means of the switching device or a controlling device of the security device, and
- electric coupling of an electric motor to the drive battery of the motor vehicle by means of the switching device when the detected current driving situation corresponds to the predetermined driving situation.

The detection device detects the current driving situation. This is preferably done consecutively, in particular continuously or intermittently. In this way, the current driving situation is available live to the security system. Determination takes place, for example, by means of a speed sensor and/or an acceleration sensor and/or by means of a camera and/or by means of a radar and/or by means of a lidar and/or by means of a temperature sensor and/or by means of a rain sensor and/or by means of a humidity sensor. Preferably, the detection is performed by means of a combination of at least some of the preceding detection means.

By means of the switching device or the controlling device, the detected current driving situation is compared with the predetermined driving situation. According to the invention, the predetermined driving situation does not mean a specific driving situation, but a set of several driving situations that represent a potential danger for the occupants, such as excessive deceleration, skidding, approaching another motor vehicle or object too rapidly so that a vehicle crash is imminent, or the like. The comparison determines whether the current driving situation corresponds to the predetermined driving situation, i.e. whether it belongs to the group of predetermined driving situations or not.

If the detected current driving situation corresponds to the predetermined driving situation, the switching device couples the electric motor electrically to the drive battery of the motor vehicle. This provides the electric motor with an additional current supply in addition to its usual current supply via the first current supply interface by means of the second current supply interface. Thus, an adjustment of the various devices by the electric motor is improved in terms of power or security.

The method according to the invention for operating a security system for a motor vehicle has the same advantages as described above for a security device for a motor vehicle for automatically moving a device of the motor vehicle in a predefined driving situation according to the first aspect of the invention and for a security system according to the invention for a motor vehicle according to the second aspect of the invention. Accordingly, the method according to the invention has the advantage over conventional methods that an automatic movement of one or more devices of the motor vehicle can be carried out more rapidly by simple means as well as in a cost-effective manner. By electrically coupling with the drive battery of the motor vehicle by means of the switching device of the second current supply interface, additional electric energy can be provided to the electric motor in a relatively short time. By means of this additional electric energy, the electric motor can be operated with a significantly higher power, so that the time required for an adjustment process of the device is reduced in an advantageous manner and/or the torque is increased.

Preferably, a resistance counteracting the electric motor is determined by means of a determination device, wherein the electric motor is electrically decoupled from the drive battery by means of the switching device if the resistance exceeds a predetermined resistance threshold value. The resistance threshold value is preferably selected in such a way that it can be reached in particular when the device of the motor vehicle is moved into an intended position by means of the security device. This is the case, for example, with a belt tensioner if the belt has a predefined belt tension. The predefined belt tension is preferably determined after a weighing process, according to which the fixation of the occupant by the belt is compared with a possible injury to the occupant by a belt that is too tight. Accordingly, such a determination device has the advantage that a risk of injury can be reduced by simple means and in a cost-effective manner, while still ensuring a high level of occupant security.

Figure 2:
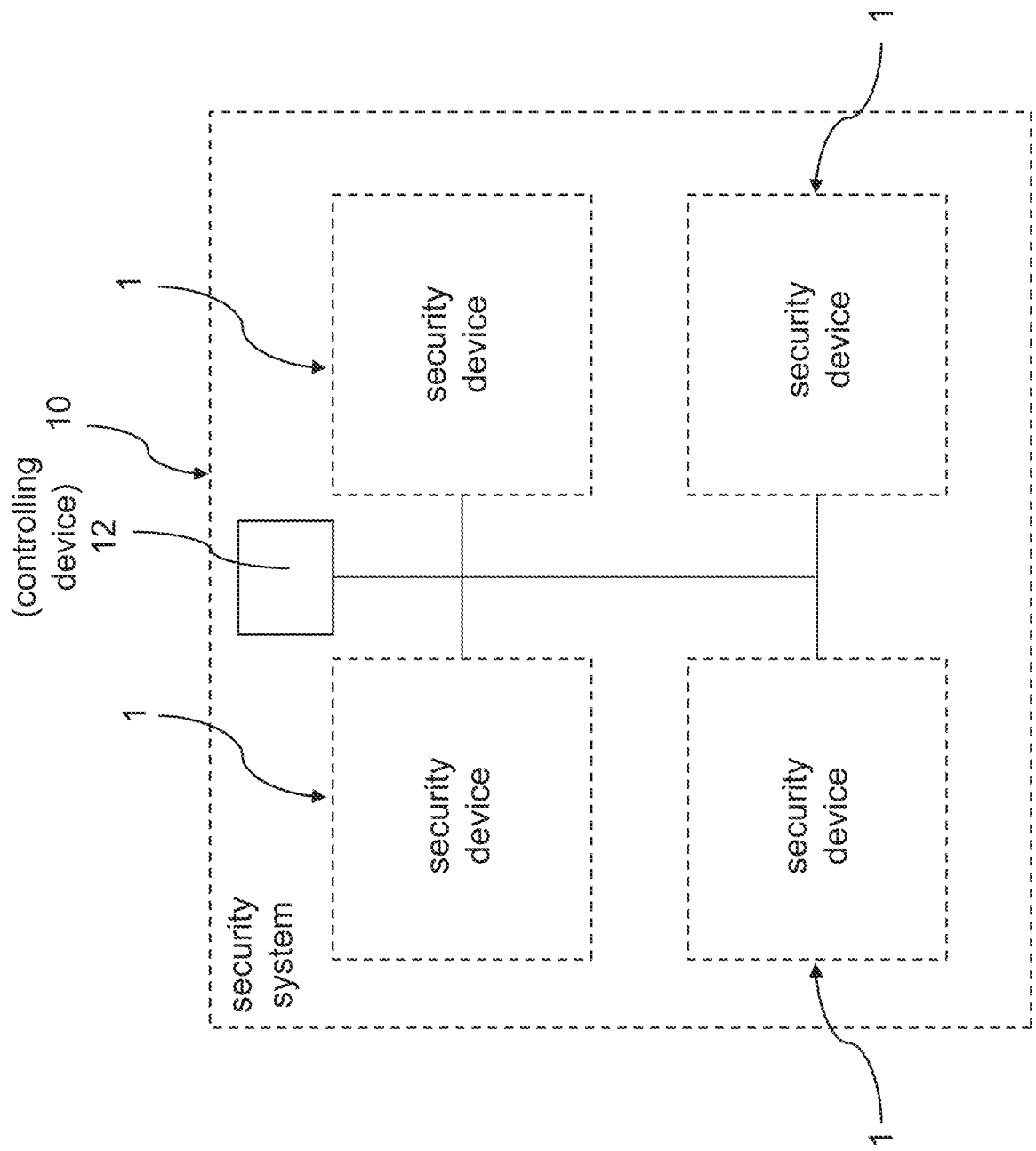
Figure 3:
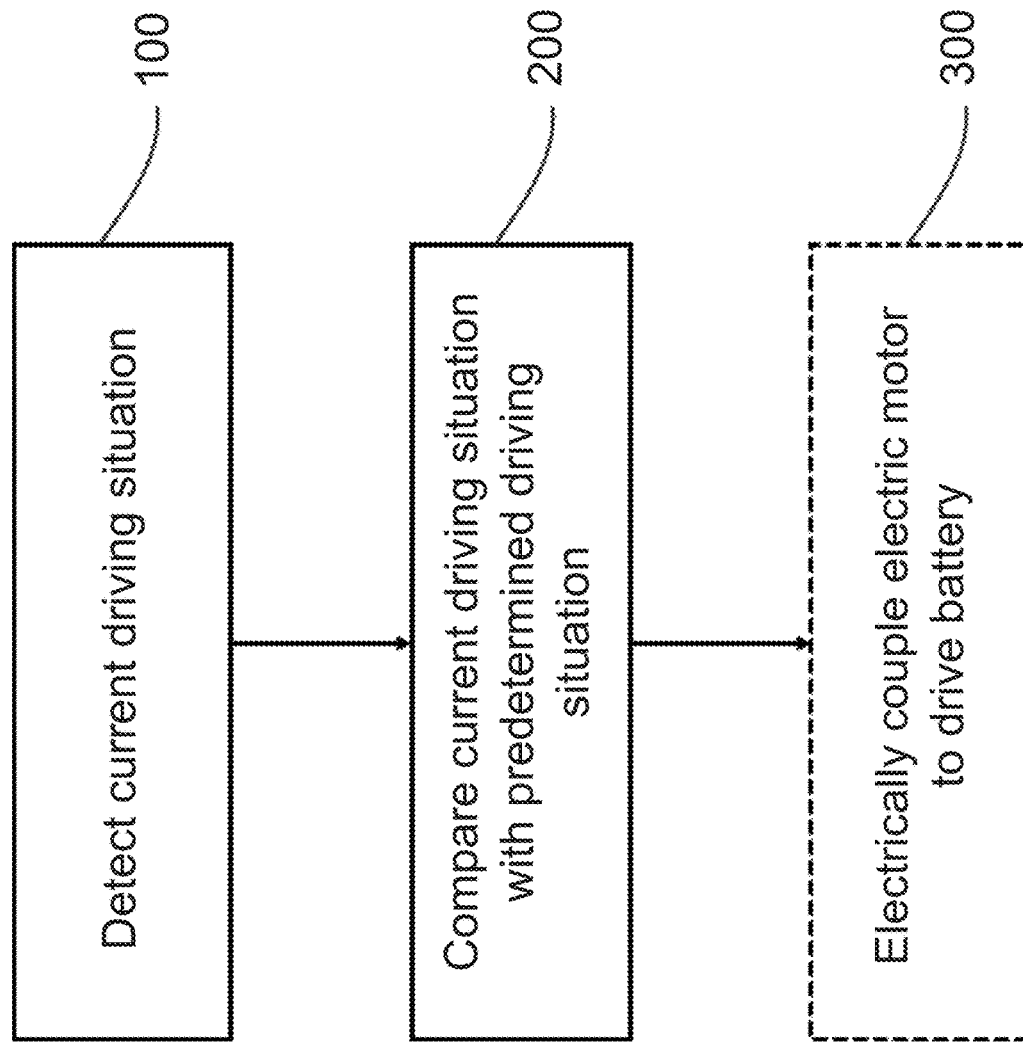

A security device according to the invention for a motor vehicle for automatically moving a device of the motor vehicle in a predefined driving situation, a security system according to the invention for a motor vehicle and a method according to the invention for operating a security system for a motor vehicle are explained in more detail below with reference to the figures. The figures show schematically in each case:

FIG. 1 a preferred first embodiment of a security device according to the invention in a side view, FIG. 2 a preferred first embodiment of a security system according to the invention in a side view, and FIG. 3 a flow chart of a preferred embodiment of a method according to the invention.

Elements with the same function and mode of operation are each given the same reference signs in FIGS. 1 to 3.

In FIG. 1, a preferred first embodiment of a security device 1 according to the invention is shown schematically in a side view. The security device 1 comprises an electric motor 2 designed as an electric flat motor and an optional controlling device 12 for controlling the electric motor 2. The electric motor 2 is designed for moving a device, in particular a seat belt or a belt tensioner, a vehicle seat or a seat adjustment of the seat components or the like, of a motor vehicle not shown. The electric motor 2 is electrically coupled to an on-board current supply system 3 of the motor vehicle via a first current supply line 13 of a first current supply interface 4 of the security device 1. In this preferred embodiment, the electric motor 2 is electrically coupled to the on-board current supply system 3 via the controlling device 12. Furthermore, the electric motor 2 can be electrically coupled to a drive battery 6 of the motor vehicle, which is designed as a HV drive battery, via a second current supply line 14, an optional voltage converter 8 and a switching device 7 of a second current supply interface 5 of the security device 1. The electric coupling of the electric motor 2 to the drive battery 6 can be established as well as disconnected by means of the switching device 7. In this preferred embodiment, the electric coupling of the electric motor 2 to the drive battery 6 takes place via the controlling device 12. According to the invention, it can also be provided that the electric motor 2 can be electrically coupled directly to the drive battery 6 via the second current supply interface 5. Furthermore, the security device 1 comprises a determination device 9 for determining a resistance which counteracts a rotation of the electric motor 2. By means of the determination device 9, it can be determined, for example, when the device to be moved has reached an end position or a specific position.

FIG. 2 shows a preferred first embodiment of a security system 10 according to the invention schematically in a side view. In this embodiment, the security system 10 comprises four security devices 1 according to the invention, which are indicated by dashed boxes for the sake of clarity. Furthermore, the security system 10 comprises a detection device 11 for detecting a driving situation of the motor vehicle. The detection device 11 is coupled to the security devices 1 in such a way that data of the determined driving situations are provided to the security devices 1.

In FIG. 3, a preferred embodiment of a method according to the invention for operating a security system 10 according to the invention for a motor vehicle is shown schematically in a flow diagram. In a first method step 100, a current driving situation of the motor vehicle is detected by means of a detection device 11 of the security system 10. This is done, for example, by evaluating camera data, radar data, speed sensor data, acceleration sensor data or the like. In a second method step 200, the detected current driving situation is compared with a predetermined driving situation by means of the switching device 7 or a controlling device 12 of the security device 1. The result of the comparison is that a predetermined driving situation is currently present or not. If a predetermined driving situation is present, an electric coupling of the electric motor 2 of the security device 1 to the drive battery 6 of the motor vehicle takes place in a third method step 300 by means of the switching device 7. This provides additional electric energy to the electric motor 2, so that a current power of the electric motor 2 is increased as a result.

LIST OF REFERENCE SIGNS

1 security device
2 electric motor
3 on-board current supply system
4 first current supply interface
5 second current supply interface
6 drive battery
7 switching device
8 voltage converter
9 determination device
10 security system
11 detection device
12 controlling device
13 first current supply line
14 second current supply line
100 first method step
200 second method step
300 third method step

The invention claimed is:

1. A security device for a motor vehicle for automatically moving a device of the motor vehicle in a predefined driving situation, comprising:
    an electric motor for moving the device; and
    a first current supply interface that can be electrically coupled to an on-board current supply system of the motor vehicle,
    wherein the security device comprises a second current supply interface for electrically coupling the electric motor to a drive battery of the motor vehicle, wherein the second current supply interface comprises a switching device, and the switching device comprises switching means for electrically coupling the electric motor to the drive battery of the motor vehicle depending on the predefined driving situation, and wherein the switching device comprises a voltage converter for converting the voltage of the drive battery to a voltage of the on-board current supply system,
    wherein the drive battery of the motor vehicle is a high-voltage drive battery, and
    wherein a current line of the second current supply interface for electrically coupling the electric motor to the drive battery of the motor, has a corresponding design to implement a resistor, such that a predominant part of the voltage of the high-voltage drive battery drops at the second current supply interface.

2. The security device according to claim 1, wherein the electric motor is designed as an electric flat motor.

3. The security device according to claim 1, wherein the security device comprises a determination device for determining a resistance opposing the operation of the electric motor, wherein the switching device comprises decoupling means for electrically decoupling the electric motor from the drive battery upon determination of a resistance exceeding a resistance threshold value.

4. The security device according to claim 1, wherein the security device is designed as a seat belt tensioning system, a seat adjustment system, a sunroof system, a comfort system or a steering wheel adjustment system.

5. The security device according to claim 1, wherein the switching device comprises consideration means for considering a current acceleration, a current deceleration, a predicted acceleration or a predicted deceleration of the motor vehicle as a predefined driving situation.

6. The security device according to claim 1, wherein the switching device comprises comparison means for comparing a current driving situation with the predefined driving situation and for activating an increased switching readiness position when a predefined proximity of the current driving situation to the predefined driving situation is determined.

7. A method for operating a security system for a motor vehicle wherein the security system comprises several security devices for a motor vehicle for automatically moving a device of the motor vehicle in a predefined driving situation, comprising an electric motor for moving the device and a first current supply interface that can be electrically coupled to an on-board current supply system of the motor vehicle, wherein the security device comprises a second current supply interface for electrically coupling the electric motor to a drive battery of the motor vehicle, wherein the second current supply interface comprises a switching device, and the switching device comprises switching means for electrically coupling the electric motor to the drive battery depending on the predefined driving situation, and wherein the switching device comprises a voltage converter for converting the voltage of the drive battery to a voltage of the on-board current supply system, wherein the drive battery of the motor vehicle is a high-voltage drive battery, comprising the following steps:
    detecting a current driving situation of the motor vehicle by means of a detection device,
    comparing the detected current driving situation with a predetermined driving situation by means of the switching device or a controlling device of the security device, and electric coupling of an electric motor to the drive battery of the motor vehicle by means of the switching device when the detected current driving situation corresponds to the predetermined driving situation.

8. The method according to claim 7, wherein
a resistance counteracting the electric motor is determined by means of a determination device, wherein the electric motor is electrically decoupled from the drive battery by means of the switching device if the resistance exceeds a predetermined resistance threshold value.

9. A security system for a motor vehicle,
wherein the security system comprises several security devices for a motor vehicle for automatically moving a device of the motor vehicle in a predefined driving situation, comprising an electric motor for moving the device and a first current supply interface that can be electrically coupled to an on-board current supply system of the motor vehicle,
wherein the security device comprises a second current supply interface for electrically coupling the electric motor to a drive battery of the motor vehicle, wherein the second current supply interface comprises a switching device, and the switching device comprises switching means for electrically coupling the electric motor to the drive battery depending on the predefined driving situation, and wherein the switching device comprises a voltage converter for converting the voltage of the drive battery to a voltage of the on-board current supply system, and wherein the drive battery of the motor vehicle is a high-voltage drive battery.

10. The security system according to claim 9, wherein
the security system comprises a detection device for detecting a driving situation of the motor vehicle.

11. The security system according to claim 9, wherein the switching device of each security device comprises coordination means for time-delayed electric coupling of the respective electric motor of each security device to the drive battery of the motor vehicle.

12. The security system according to claim 9, wherein the switching devices comprise occupancy means for electrically coupling the respective electric motors of the security devices to the drive battery of the motor vehicle depending on a detected seat occupancy of the motor vehicle.

* * * * *